United States Patent
Geisler et al.

(10) Patent No.: US 10,330,084 B2
(45) Date of Patent: Jun. 25, 2019

(54) WIND PARK WITH A FEED-FORWARD CONTROL SYSTEM IN THE POWER REGULATOR

(71) Applicant: Senvion GmbH, Hamburg (DE)

(72) Inventors: Jens Geisler, Rendsburg (DE); Roman Bluhm, Norderstedt (DE); Thomas Ott, Westerrönfeld (DE); Thomas Schröter, Hamburg (DE)

(73) Assignee: Senvion GmbH, Hamburg (DE)

( * ) Notice: Subject to any disclaimer, the term of this patent is extended or adjusted under 35 U.S.C. 154(b) by 0 days.

(21) Appl. No.: 15/113,177

(22) PCT Filed: Jan. 14, 2015

(86) PCT No.: PCT/EP2015/050608
§ 371 (c)(1),
(2) Date: Jul. 21, 2016

(87) PCT Pub. No.: WO2015/110335
PCT Pub. Date: Jul. 30, 2015

(65) Prior Publication Data
US 2017/0009740 A1      Jan. 12, 2017

(30) Foreign Application Priority Data

Jan. 22, 2014  (DE) .......... 10 2014 000 784

(51) Int. Cl.
*G06F 19/00*    (2018.01)
*F03D 7/04*    (2006.01)
(Continued)

(52) U.S. Cl.
CPC .............. *F03D 7/048* (2013.01); *F03D 9/257* (2017.02); *H02J 3/386* (2013.01); *H02J 3/46* (2013.01); *Y02E 10/725* (2013.01); *Y02E 10/763* (2013.01)

(58) Field of Classification Search
CPC ........... H02J 3/386; H02J 3/46; Y02E 10/763; Y02E 10/723; Y02E 10/725;
(Continued)

(56) References Cited

U.S. PATENT DOCUMENTS 6,058,322 A * 5/2000 Nishikawa ............ G06T 7/0012
                                                   600/408
6,894,281 B2 * 5/2005 Such ..................... G01T 1/1644
                                                   250/363.1
(Continued)

FOREIGN PATENT DOCUMENTS

WO   WO-2006/066797    6/2006

OTHER PUBLICATIONS

International Search Report and Written Opinion dated Jul. 6, 2015, directed to PCT Application No. PCT/EP2015/050608; 8 pages.

*Primary Examiner* — Kidest Bahta
(74) *Attorney, Agent, or Firm* — Morrison & Foerster LLP

(57) ABSTRACT

A wind park comprising at least two wind turbines that produce electrical power by means of a wind rotor and a generator and delivers this to an accumulating network, and comprising a park master that is configured to control said wind turbines and has a power regulator whose input is supplied with a target power signal and, at whose output, power control signals are emitted for the wind turbines, said power regulator comprising a feed-forward control module that imposes a value for the target power onto the output of said power regulator by means of a multiplication element.

18 Claims, 4 Drawing Sheets

(51) Int. Cl.
*H02J 3/38* (2006.01)
*H02J 3/46* (2006.01)
*F03D 9/25* (2016.01)

(58) Field of Classification Search
CPC ..... Y02E 10/721; Y02E 60/60; Y02E 10/722; Y02E 10/72; Y02E 10/74; Y02E 10/28; Y02E 40/16; Y02E 40/22; F03D 7/048; F03D 9/257
See application file for complete search history.

(56) References Cited

U.S. PATENT DOCUMENTS

| | | | | |
|---|---|---|---|---|
| 6,975,925 | B1 * | 12/2005 | Barnes | F03D 7/048 |
| | | | | 700/286 |
| 7,528,496 | B2 * | 5/2009 | Fortmann | F03D 7/0264 |
| | | | | 290/44 |
| 8,853,877 | B1 * | 10/2014 | Zalar | F03D 7/048 |
| | | | | 290/44 |
| 2006/0123367 | A1 * | 6/2006 | Sakurabayashi | G06F 17/5077 |
| | | | | 257/774 |
| 2006/0126367 | A1 * | 6/2006 | Hesterman | H02M 7/04 |
| | | | | 363/89 |
| 2007/0287201 | A1 * | 12/2007 | Ishizu | H01L 21/67248 |
| | | | | 438/10 |
| 2008/0073912 | A1 * | 3/2008 | Fortmann | H02J 3/1885 |
| | | | | 290/44 |
| 2008/0143304 | A1 * | 6/2008 | Bose | H02J 3/06 |
| | | | | 323/205 |
| 2008/0284172 | A1 * | 11/2008 | Nielsen | F03D 7/026 |
| | | | | 290/44 |
| 2009/0218818 | A1 * | 9/2009 | Cardinal | F03D 7/0284 |
| | | | | 290/44 |
| 2010/0114397 | A1 * | 5/2010 | Cardinal | H02J 3/383 |
| | | | | 700/297 |
| 2010/0268393 | A1 * | 10/2010 | Fischle | F03D 7/028 |
| | | | | 700/287 |

* cited by examiner

WIND PARK WITH A FEED-FORWARD CONTROL SYSTEM IN THE POWER REGULATOR

CROSS-REFERENCE TO RELATED APPLICATIONS

This application is a national stage application under 35 USC 371 of International Application No. PCT/EP2015/050608, filed Jan. 14, 2015, which claims priority to German Application No. 10 2014 000 784.7, filed Jan. 22, 2014, the entire contents of which are incorporated herein by reference.

FIELD OF THE INVENTION

The present invention relates to a wind farm including at least two wind turbines which generate electric power by means of a wind rotor and a generator and output it to a busbar grid, and a farm master which is designed for guiding the wind turbines, wherein the farm master includes a power regulator, at the input of which a setpoint power signal is applied, and at the output of which power control signals for the wind turbines are output.

BACKGROUND OF THE INVENTION

Due to the extensive additional construction of wind turbines and wind farms, they are playing an increasingly important role in power generation on the electric grid. Grid operators are therefore requiring that wind farms also actively participate in regulation on the grid. Among other things, this relates to the provision of reactive power, but also to measures for monitoring the real power which is output. However, wind farms differ from conventional power plants in one important aspect; namely, the power output by them cannot be freely determined, but is a function of the wind speed in general and the wind conditions at the individual wind turbines on the wind farm in particular.

Generally, a setpoint specification for the power to be output is now transmitted to wind farms. Clearly, in the event of an increase in the power requirement, the wind farms are possibly only able to follow to a limited extent, depending on the wind conditions. However, in the event of a decrease in the power requirement, they are always able to respond, namely, by throttling the wind farm's wind turbine; thus, they do not fully exploit the available wind. In this direction, i.e., in the case of downward setpoint adjustments for the power, wind farms are in principle thus fully usable for grid regulation.

This is exploited by setting a setpoint value at the farm master for the power to be output. The farm master drives the wind turbine in such a way that corresponding power is generated and output to the grid, if the wind conditions permit it. If they do not permit it, the setpoint value is not reached, but the wind farm feeds in as much power as is currently possible.

If the grid operator now requires a reduction in the power output, the setpoint value provided to the farm master is correspondingly lowered. To avoid overshoots or undershoots in the power output, this generally is not carried out abruptly, but gradually as a ramp. The ramp-shaped reduction of the setpoint value also takes into account the fact that corresponding throttle signals must first be transmitted to the wind turbines distributed on the wind farm, and they must each individually adjust the pitch of their rotor blades in order to carry out the desired power reduction.

In the case of weak wind conditions, it is often the case that the power actually output is less than the setpoint value, i.e., the setpoint value is rather high. This discrepancy is unavoidable on a wind farm and is not problematic as such. However, in practice, problems occur if the setpoint value is significantly reduced starting from its rather high value. Due to the discrepancy with the much lower actual power output, the ramp-like decrease in the setpoint value initially has no effect at all, since the setpoint value is still above the actual value. The power output of the wind farm is actually reduced only if the setpoint value has decreased so much that it reaches the actual value and then decreases further. The wind farm thus responds to the requested power reduction in a delayed manner. There is an undesirable time lag. From the point of view of the grid operator, this is disadvantageous. However, it is even more disadvantageous for the grid operators that the length of the time lag is not fixed; rather, the greater that the discrepancy between the setpoint value and the lower actual power output initially was, the longer the time lag is. In terms of regulation, such behavior is difficult to manage and constitutes a risk for the system stability of the grid.

SUMMARY OF THE INVENTION

An object of the present invention is to provide an improved wind farm which avoids these disadvantages.

This can be achieved according to the invention by the features broadly described below. Advantageous refinements are disclosed in the detailed embodiments described below.

In a wind farm including at least two wind turbines which generate electric power by means of a wind rotor and a generator and output it to a busbar grid, and a farm master which is designed for guiding the wind turbines, wherein the farm master includes a power regulator, at the input of which a setpoint power signal is applied, and at the output of which power control signals for the wind turbines are output, it is provided according to the present invention that the power regulator has a feed-forward control module which applies a measure of the setpoint power to the output of the power regulator via a multiplication element.

An essential aspect of the present invention is that the feed-forward control module is not applied additively to the output of the power regulator, but rather multiplicatively. Thus, a significantly accelerated response behavior may be achieved, in particular in the case of setpoint value reduction. It is to the credit of the present invention to have recognized that a conventional feed-forward control system is not sufficient the desired improved behavior, but rather that another kind of application is needed, namely, via a multiplication element. It not only provides the advantage of more rapid response behavior, but is also robust with respect to the operating state of the wind farm, i.e., whether much or little power is generated. By multiplying by the power signal which is output by the power regulator, an automatic adjustment of the feed-forward control module to the particular power level is achieved. This cannot be achieved via an additive combination alone. The present invention thus combines advantages with respect to more rapid response behavior with robustness in terms of the operating state of the wind farm, in a strikingly simple and elegant manner.

Via the multiplication element, the feed-forward control system operates, in a manner of speaking, in parallel with the power regulator. Advantageously, a stationarily exact element is provided in order to be able to better adjust a desired power value. Such stationarily exact elements, in particular in the form of an I-element, are known per se in the prior art, but not in combination with a multiplicatively applied feed-forward control module.

Due to the feed-forward control module and the rapid response from setpoint value changes, in particular setpoint value reductions, which is thereby effected, the power regulator is relieved in this respect. With respect to its parameterization, it is no longer primarily necessary to pay attention to rapid response behavior. The present invention utilizes this in that it preferably provides a double parameter set for the power regulator. One of the parameter sets is used as needed in order to parameterize the power regulator. In this case, the sign of a control difference formed at the power regulator is advantageously taken into account as a criterion, i.e., positive for increases and negative for reductions. Depending on the sign, one of the two parameter sets is then used for the power regulator. Switching between the parameter sets may occur at any time, i.e., dynamically. One configuration has proven to be particularly advantageous, in which the parameter set for the reduction has a shorter time constant than the parameter set for the increase; namely, by approximately an order of magnitude. "Approximately an order of magnitude" is considered to be a factor of approximately 8 to 14, preferably approximately 10. A particularly good adaptation to the particular conditions of wind turbines is thereby achieved. They are not able to increase their power output or are only able to increase it quite slowly; however, they are capable of reducing their power output quickly. Such a controller configuration as provided takes this intrinsic behavior of the wind turbine into account.

In order to satisfy the high requirements for the stability of the grid, it is advantageously provided that the feed-forward control module has a correction limiter. The change effected by the feed-forward control module is thus limited, which has an advantageous effect on the stability. Simultaneously, it allows setting of rather larger amplification factors without the risk of instability occurring for that reason. Advantageously, the correction limiter is designed asymmetrically. Here, "asymmetric" may be understood to mean that the lower limit has a different offset than the upper limit. For the present invention, it has proved to be of value to select the lower limit to be fixed and to keep the upper limit variable. Thus, the seemingly opposing requirements for rapid response behavior on the one hand and stability during operation on the other hand may be advantageously linked.

For generating the upper limit, a maximum finder is advantageously provided. It is designed to ascertain the wind turbine from among the different wind turbines on the wind farm which generates the maximum electric power and feeds it into the grid. This maximum output power, more precisely, the associated power level normalized to the nominal output power of the wind turbine (0.75 for a wind turbine which is at 75% of capacity, for example), is taken as a basis when forming the upper limit of the correction limiter, so that the risk of an undesirable throttling of wind turbines operating in heavy winds and thus having high power output is avoided. Preferably, by adding a fixed value, it is ensured that the upper limit is always greater than the lower limit.

A rapid response by the power regulation is desirable per se, as initially described. However, it must be taken into account that the regulated system (the wind turbines) has mechanical components which do not respond in an arbitrarily rapid manner, by virtue of their inert mass. If a rate of change were to be required which is too high, the wind turbine thus would not be able to follow at all. As a result, deviations would occur which would be detected as control deviations by the power regulator and which would result in a further, additional change at its output, which, however, the wind turbine is not able to follow at all in any case. Such a state is undesirable. It is therefore advantageous to balance the feed-forward control system, being a desirable rapid response means per se, with a corrective which limits the rate of change to the extent that it is still compatible with the wind turbine. For this purpose, a dynamic blocking element is preferably provided which is connected to the output of the multiplication element (i.e., in the signal path behind the feed-forward control system, in order to determine its influence as well). The dynamic blocking element is designed to monitor the rate of change at this output and to block the power regulator if a limit value is exceeded. A further increase in the values at the output, which could result in the wind turbine being overloaded, is thus prevented. Preferably, this takes place in such a way that the power regulator retains the previous value in the blocked state. Thus, its state persists and smooth deployment is again possible if the dynamic blocking element cancels the blocking.

Advantageously, a preferably simplified model of the wind turbine is implemented in the dynamic blocking element. It is thus possible to match it to the behavior of the wind turbine more exactly, in particular in the case of changes in the demanded power output. The model does not necessarily have to be particularly complex for this purpose. For reasons of more rapid calculation, a simplified model is even advantageous. It is particularly advantageous if the simplified model is bimodal in the sense that it provides different time constants for reducing power and increasing power. Generally, a wind turbine is able to follow a power output reduction rapidly, whereas a delay time results for a power output increase due to the required adjustment of the wind rotor. A particularly simple as well as advantageous model therefore provides a delay element for the power output increase, wherein one of the first order is sufficient. Thus, a significantly improved dynamic behavior is achieved without great complexity, in particular in the case of high rates of change as well.

The present invention furthermore extends to a corresponding method. For a more detailed explanation, reference is made to the above description.

BRIEF DESCRIPTION OF THE DRAWINGS

The present invention is explained in greater detail below based on an advantageous exemplary embodiment, with reference to the drawing. The following are shown.

DETAILED DESCRIPTION OF THE INVENTION

Figure 1:
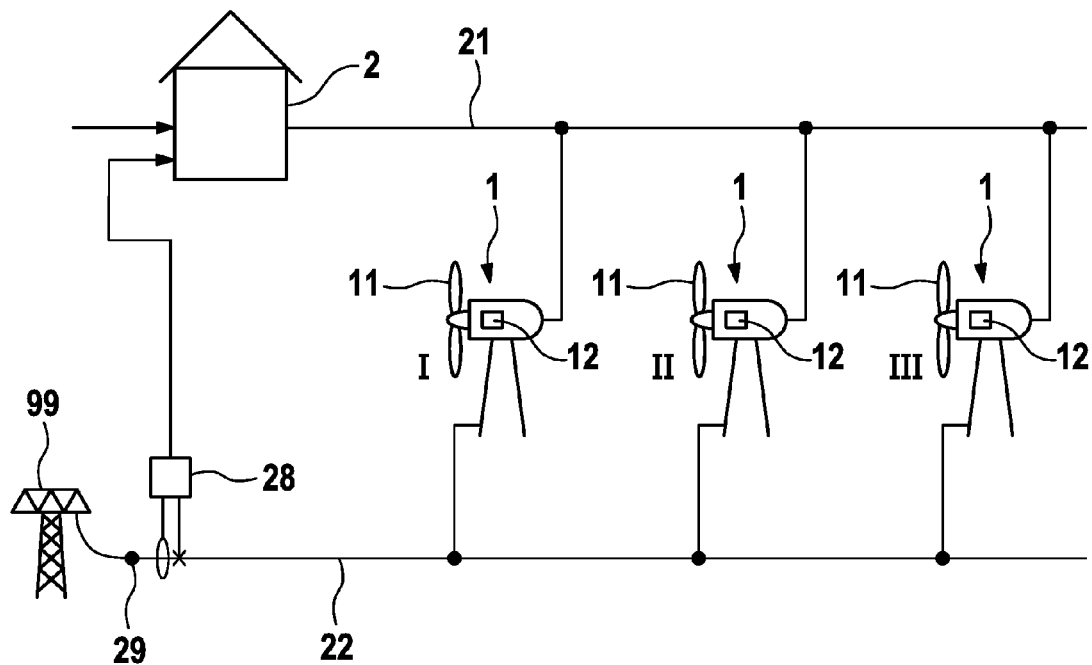
FIG. 1 shows an overview of a wind farm including a farm master and multiple wind turbines according to one exemplary embodiment of the present invention.
Figure 2:
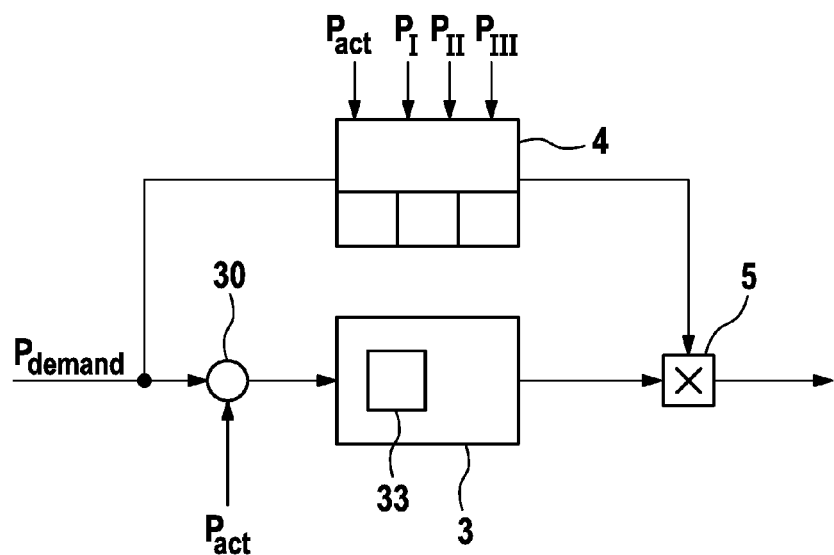
FIG. 2 shows a schematic view of the farm master including a feed-forward control system.

An exemplary embodiment of a wind farm according to the present invention is depicted in FIG. 1. It includes a farm master 2 and multiple wind turbines 1, which are further labeled with the characters I, II, and III for purposes of differentiation. Each of the wind turbines 1 has a wind rotor 11 including a generator 12 which is driven by it for generating electric power, which is fed into a busbar grid 22 of the farm and is output at a connection point 29 to a transmission grid 99.

The farm master 2 monitors and controls the operation of the wind turbines 1. For this purpose, it includes a power regulator 3. A setpoint power value Pdemand, which is preferably provided by an externally superordinate instance (not shown), and a value for the current power feed-in Pact, which is determined by a power measuring module 28 which monitors voltage and current at the connection point 28, are applied as input signals. The difference ascertained by a difference element 30 is applied to the power regulator 3 as a signal for the control difference. From it, the power regulator 3 ascertains default values for the wind turbines 1. For this purpose, it includes an I-element 33 which is designed in the depicted exemplary embodiment as a discrete integrator including a summing element 34 and a fed-back delay element (1/z) 35.

The control difference formed at the input of the power regulator 3 is not supplied directly to the I-element, but is preprocessed by means of a switchable parameter set 6. For this purpose, a sign detector 40 is provided which analyzes the control difference formed by the difference element 30 to establish whether it is positive or negative. If the sign is positive, the parameter set 61 is selected and the control difference is processed using the parameters associated with this parameter set. In the depicted exemplary embodiment, there is only one parameter, namely for a P-element 62. If the sign is negative, the parameter set 61' is selected and the control difference is processed using the parameters associated with this parameter set, namely in the depicted example, by means of the P-element 62'. The values thus generated are merged by means of a fusion element 63 driven by the sign detector 60 and supplied to the I-element 33. The values of the parameter sets are chosen in such a way that the parameter set 61' for the negative sign (i.e., a downward change) a shorter time constant than the parameter set 61 for the positive sign, preferably by a factor of 10 (corresponding to an order of magnitude).

According to the present invention, the farm master 2 furthermore includes a feed-forward control module 4. It is connected in parallel with the power regulator 3, and the signal for the setpoint power value Pdemand is applied to its input, as well as values for the power Pact actually output by the farm and the powers of the individual wind turbines 1. The output value determined by the feed-forward control module 4 is applied via a multiplication element 5 to the output signal of the power regulator 3, and the product thus obtained is subsequently transmitted via an internal farm signal network 21 to the wind turbines 1.

The feed-forward control module 4 and its interaction with the power regulator 3 are explained in greater detail below. The signal for the setpoint power value Pdemand is applied as an input signal to the feed-forward control module 4 and to the difference element 30 at the input of the power regulator 3. Furthermore, the actual current power Pact ascertained by the power measuring module 28 is still applied to the difference element 30.

The feed-forward control module 4 includes a fast forward channel 40 via which the signal for the setpoint power Pdemand applied at its input is directly output and applied to the multiplication element 5. Thus, a desirable rapid response to the setpoint value changes is achieved, which automatically scales to the power level which is actually output, as a result of the multiplicative application. A rapid and robust response is thus achieved.

For purposes of refinement, the feed-forward control module 4 has additional channels 41 and 42 via which it acts on the power regulator. The channel 41 acts on a correction limiter 7 and receives values for the power PI, PII, and PIII output by the individual wind turbines 1. These values are queried by the farm master 2 from the individual wind turbines 1 via the signal network 21. These values are applied to a maximum detector 73, which ascertains the highest of these power values and outputs it as a normalized power signal to a summing element 74. Furthermore, a signal for a base value Offset is also applied to the summing element 74. The sum signal thus formed is applied to a limiting element 75 which carries out a limitation to 1 corresponding to the nominal power. This signal thus obtained is applied to a division element 76 which carries out a division by the value, also normalized, for the setpoint power Pdemand. The signal thus obtained is supplied to a second limiting element 77, which limits it downwardly to 1, and it is then applied to an upper limit input 72 of the correction limiter 7. In the depicted exemplary embodiment, a fixed normalized power value of 0.5 is applied to a lower limit input 71, which, however, may optionally also be replaced by a higher value.

The channel 42 acts on an initializer 9 which, as part of the feed-forward control system 4, is designed to initialize the power regulator 3 in certain situations by means of a ramp function. To detect these particular situations, the initializer 9 has an input stage which is made up of two comparison modules 93, 94. Signals for the setpoint power Pdemand and the current power Pact are applied to the first comparison module 93. It checks whether the requested setpoint power is less than the power currently output by the wind farm. If this is the case, a logic signal is output as an enable. The signal for the current power Pact is also applied to the second comparison module 94, as well as a difference signal which is generated as an output signal of the correction limiter 7 via a difference element 95 comparing a rate tolerance value T. If the current power is lower, an enable logic signal is also output; if it is not, this means that the current power is close enough to the new setpoint value that it may be directly achieved, and an initialization of the ramp is not required. If both enable signals are present, a logic block 96 connects through when an activation signal 97 is applied. The output of the initializer 9 is then set to the value of the currently output power Pact. Thus, the ramp function for the setpoint value Pdemand is forced to begin directly at the value for the current power Pact, so that a spontaneous response is achieved.

Furthermore, a predictor 98 may be connected to the initializer 9. It is designed to generate an estimated value for the setpoint power specification for the wind turbines in the case of a sudden upward change in the setpoint value. By initializing to this estimated value in the case of such a sudden change in the setpoint value, an improved transient behavior may be achieved. The predictor 98 is the subject matter of another application simultaneously submitted by the applicant.

In order to avoid a negative effect on the power regulator 3 by the feed-forward control module 4 in the case of very rapid changes, a dynamic blocking element 8 is provided. The signal generated by the multiplication element 5 is connected to it. It monitors the signal by means of a simplified mathematical model 82 of the wind turbine 1 and, in the case of changes which are too rapid, influences the blocking elements 81 which act on the parameter sets 61, 61'. Thus, a so-called anti-windup is achieved for the power regulator 3. In order nonetheless to ensure the desired rapid response behavior, the model 82 is preferably structured in such a way that, following an integrator 83 as the input stage, it comprises an upper path 84 including a first-order delay element 86, as well as a limiter 88 and a lower path 85, which are merged at a difference block 89, which in turn outputs the output signal for the activation of the blocking elements 81. In the case of a power increase, the delay element 86 thus ensures that the slow processes occurring at the actual wind turbine, such as the pitch adjustment of the rotor blades, are taken into account in the model. Thus, correct controller guidance is also achieved in this case.

Figure 3:
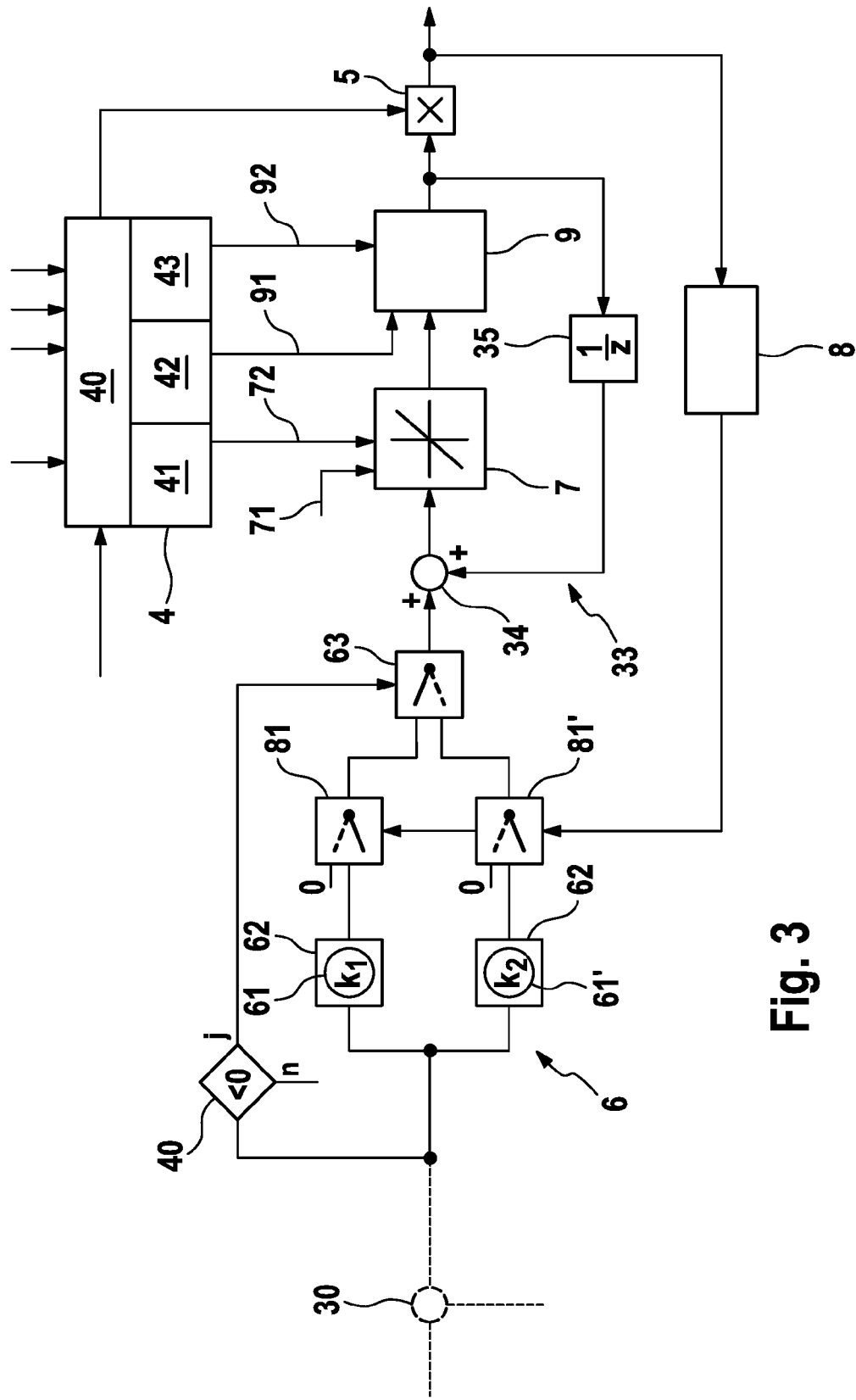
FIG. 3 shows a block diagram of a power regulator of the farm master and the feed-forward control system.
Figure 4:
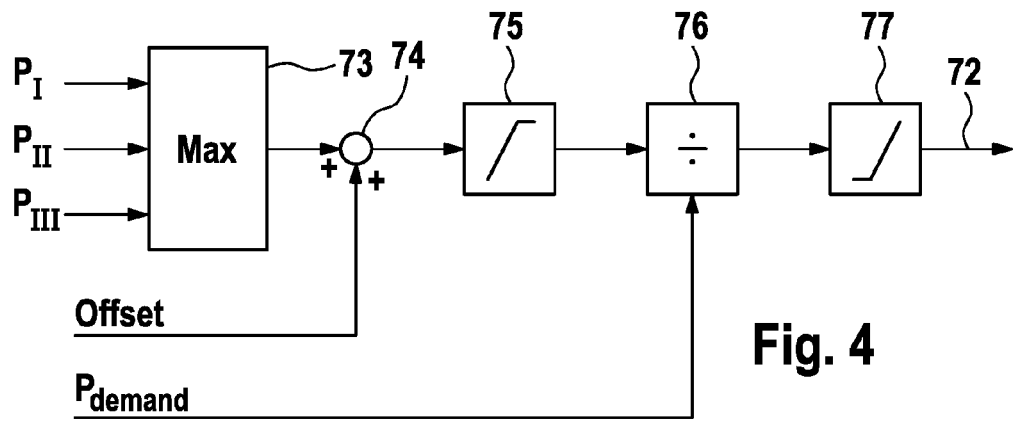
FIG. 4 shows a detailed view of a correction limiter.
Figure 5:
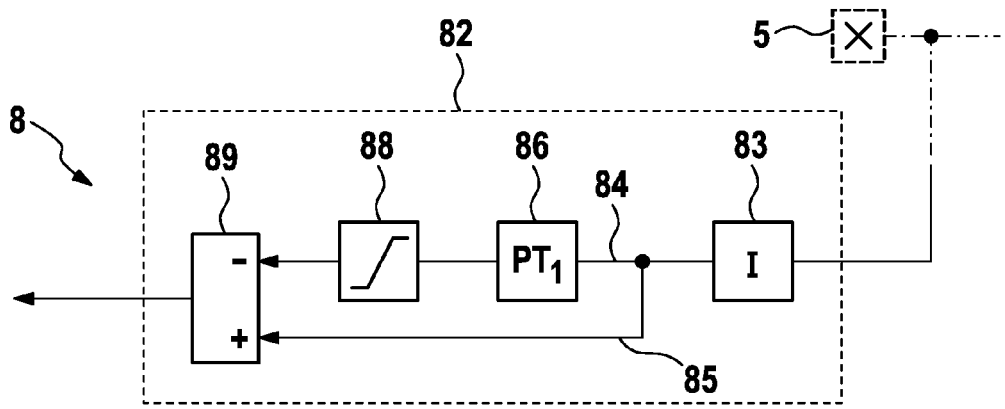
FIG. 5 shows a detailed view of a dynamic blocking element.
Figure 6:
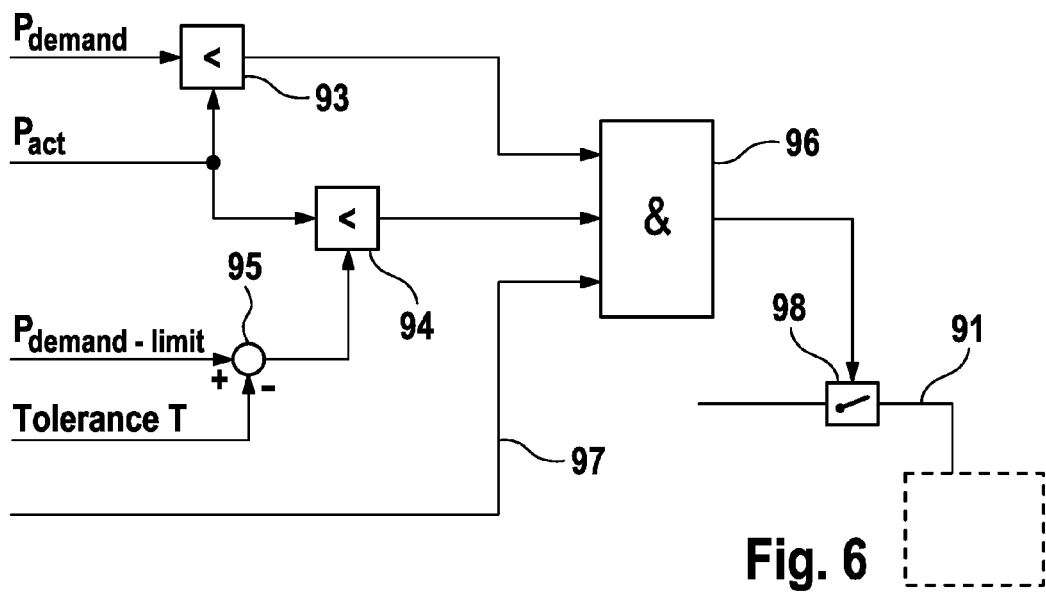
FIG. 6 shows a detailed view of an initialization module.

The interaction of the above-described components is depicted in FIG. 3. It shows the power regulator 5 including the difference element 30 for forming the control difference at the beginning, from where the signal is supplied via the selectable parameter sets 61, 61' to the I-element 33 with the summing element 34 and the delay element 35, namely including the initializer 9 and the correction limiter 7, which are both driven by channels of the feed-forward control module 4. Furthermore, the feed-forward control module 4 acts via its channel 41 directly on the multiplication element 5. The dynamic blocking element 8, which is also connected to its output, is fed back to the parameter selection module 6.

Figure 7:
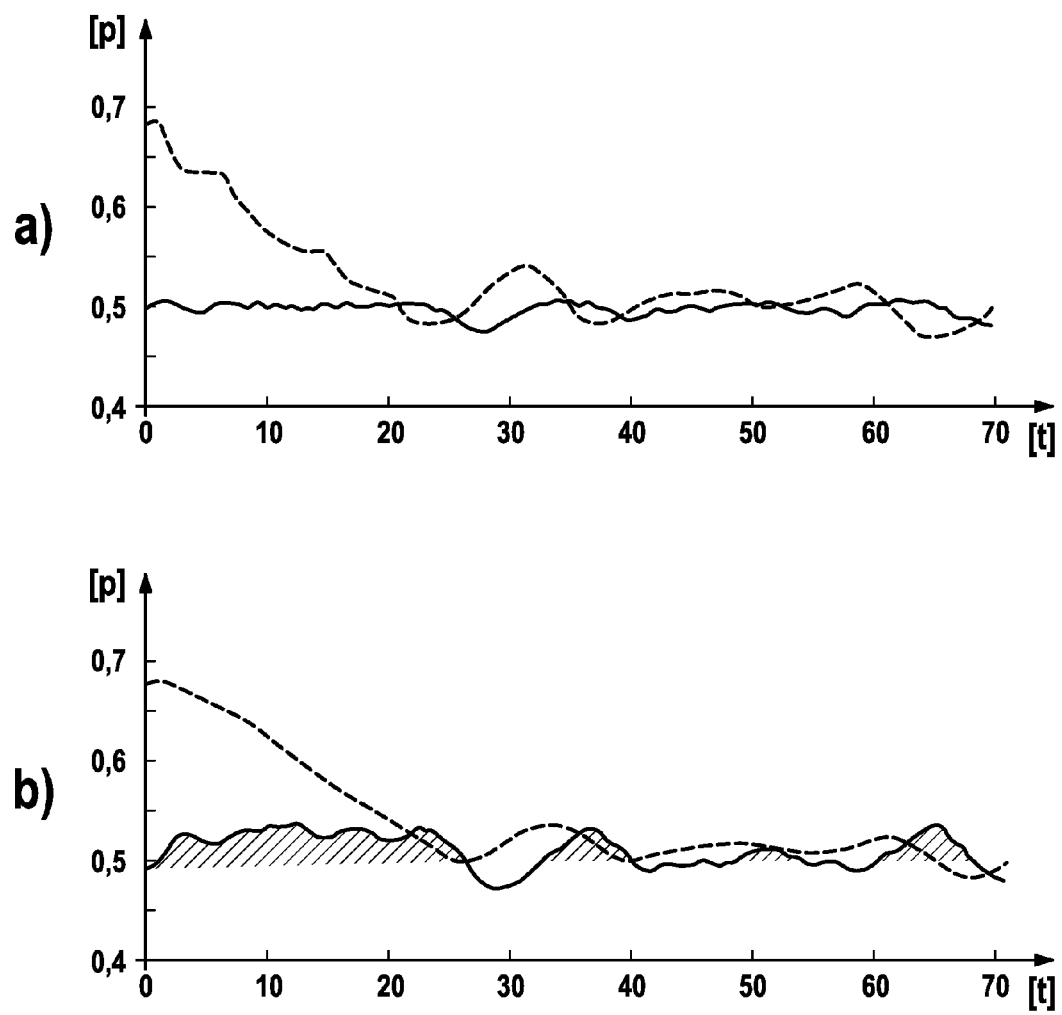
FIG. 7 shows a graphic comparison of the behavior of the wind farm with and without the present invention.

FIG. 7 shows power diagrams for wind farms with (FIG. 7a) and without (FIG. 7b) the feed-forward control module 4 according to the present invention. The wind conditions are somewhat weak but rather turbulent, so that the wind turbines generate approximately 70% of their nominal power in a fluctuating manner. At time t=0, the output power of the wind farm is limited in that the setpoint value for the power is reduced from previously unlimited to 0.5 (corresponds to half the nominal power).

The dashed line shows the setpoint value for the power output by the farm master 2 to the wind turbines 1, and the solid line shows the actual output power of the farm overall. It is apparent that in FIG. 7a, the setpoint value transmitted to the wind turbines initially drops more rapidly than without the present invention, as depicted in FIG. 7b. The improvement achieved via the present invention becomes even clearer with regard to the actual result, i.e., the power actually output by the wind farm (solid line). Without the present invention, it increases (see FIG. 7b) in the course of the first 25 seconds to values above 0.5, although the setpoint value applied to the farm requires a reduction to 0.5. This undesirable increase is indicated by hatching. In comparison, it is clear that via the present invention (FIG. 7a), such an undesirable behavior is absent; the power actually output is virtually constantly at the desired value and deviates only slightly at a later point in time.

The invention claimed is:

1. A wind farm comprising at least two wind turbines configured to generate electric power using a wind rotor and a generator and output the electric power to a busbar grid, and a farm master configured to control the wind turbines, wherein the farm master includes a power regulator comprising an input for a setpoint power signal and an output for power control signals for the wind turbines, wherein the power regulator comprises a feed-forward control module configured to apply a measure of the setpoint power to the output of the power regulator via a multiplication element, wherein the feed-forward control module comprises a fast forward channel for directly outputting the measure of the setpoint power signal received at an input of the feed-forward control module.

2. The wind farm of claim 1, wherein the feed-forward control module includes a stationarily exact element.

3. The wind farm of claim 1 wherein the power regulator is parameterized via at least one parameter and has a double parameter set.

4. The wind farm of claim 3, comprising a sign detector configured such that one of the two parameter sets is selected, depending on the sign of a control difference.

5. The wind farm of claim 4, wherein the parameter set for a sign corresponding to a downward change is selected and has a shorter time constant than the parameter set for a sign corresponding to an upward change.

6. The wind farm of claim 1, wherein the feed-forward control module comprises a correction limiter.

7. The wind farm of claim 6, wherein the correction limiter is provided with a fixed lower limit and a variable upper limit.

8. The wind farm of claim 7, comprising a maximum finder which ascertains the wind turbine having maximum power output and determines its power level, which is applied for changing the upper limit at the correction limiter.

9. The wind farm of claim 1, wherein a dynamic blocking element is connected at an output of the multiplication element and is configured to monitor a rate of change of the output and block the power regulator if a limit value is exceeded.

10. The wind farm of claim 9, wherein the feed-forward control module is configured such that the feed-forward control module retains the previous value in the blocked state.

11. The wind farm of claim 9 wherein a simplified model of the wind turbine is implemented in the dynamic blocking element.

12. The wind farm of claim 11, wherein the model is bimodal, having different time constants for reducing power and increasing power.

13. The wind farm of claim 12, wherein for increasing power, the model includes a delay element, preferably of the first order.

14. A method for operating a wind farm that includes at least two wind turbines configured to generate electric power using a wind rotor and a generator and output the electric power to a busbar grid, and a farm master configured to control the wind turbines, wherein the farm master includes a power regulator comprising an input for a setpoint power signal and an output for power control signals for the wind turbines the method comprising:
carrying out feed-forward control at the power regulator by: generating a measure of the setpoint power, multiplying the measure by a signal output at the output of the power regulator, and transmitting the result of the multiplication to the wind turbines.

15. The wind farm of claim 2, wherein the stationarily exact element is an I-element.

16. The wind farm of claim 5, wherein the time constant for the parameter set for a sign corresponding to a downward change is shorter by an order of magnitude.

17. The wind farm of claim 6, wherein the correction limiter is configured asymmetrically.

18. The wind farm of claim 13, wherein the delay element is of the first order.

* * * * *